United States Patent
Anand et al.

(10) Patent No.: US 8,350,509 B2
(45) Date of Patent: Jan. 8, 2013

(54) POWER SWITCHING SYSTEM INCLUDING A MICRO-ELECTROMECHANICAL SYSTEM (MEMS) ARRAY

(75) Inventors: Pradeep Kumar Anand, Karnataka (IN); Sriram Changali, Kerala (IN); John Kenneth Hooker, Louisville, KY (US); Remesh Kumar Keeramthode, Andhra Pradesh (IN); Brent Charles Kumfer, Plainville, CT (US)

(73) Assignee: General Electric Company, Schenectady, NY (US)

( * ) Notice: Subject to any disclaimer, the term of this patent is extended or adjusted under 35 U.S.C. 154(b) by 190 days.

(21) Appl. No.: 12/984,338

(22) Filed: Jan. 4, 2011

(65) Prior Publication Data

US 2012/0169266 A1 Jul. 5, 2012

(51) Int. Cl.
*H02P 6/14* (2006.01)
*H01H 51/22* (2006.01)

(52) U.S. Cl. ............. 318/400.26; 318/400.22; 257/415; 335/78

(58) Field of Classification Search ............. 318/400.26, 318/400.22, 254, 245; 361/13, 91.1; 363/126, 363/127; 257/415; 307/113; 335/78
See application file for complete search history.

(56) References Cited

U.S. PATENT DOCUMENTS

| 7,554,222 | B2* | 6/2009 | Kumfer et al. | 307/113 |
|---|---|---|---|---|
| 7,663,456 | B2* | 2/2010 | Subramanian et al. | 335/78 |
| 7,751,212 | B2* | 7/2010 | Perkinson | 363/127 |
| 2003/0081366 | A1* | 5/2003 | Bruckmann et al. | 361/91.1 |
| 2005/0139941 | A1* | 6/2005 | Allison et al. | 257/415 |
| 2007/0139145 | A1* | 6/2007 | Subramanian et al. | 335/78 |
| 2008/0165457 | A1 | 7/2008 | Premerlani et al. | |
| 2008/0259663 | A1* | 10/2008 | Perkinson | 363/126 |
| 2008/0285314 | A1* | 11/2008 | Kojori | 363/37 |
| 2009/0115255 | A1* | 5/2009 | Kumfer et al. | 307/113 |
| 2010/0061024 | A1* | 3/2010 | Premerlani et al. | 361/13 |

FOREIGN PATENT DOCUMENTS

JP 2008043018 A 2/2008

* cited by examiner

*Primary Examiner* — Paul Ip
(74) *Attorney, Agent, or Firm* — Cantor Colburn LLP

(57) ABSTRACT

A switching system includes a plurality of diodes forming a diode bridge, and a micro-mechanical system (MEMS) switch array closely coupled to the plurality of diodes. The MEMS switch array is electrically connected in an (M×N) array. The (M×N) array includes a first MEMS switch leg electrically connected in parallel with a second MEMS switch leg. The first MEMS switch leg includes a first plurality of MEMS dies electrically connected in series, and the second MEMS switch leg includes a second plurality of MEMS dies electrically connected in series.

20 Claims, 1 Drawing Sheet

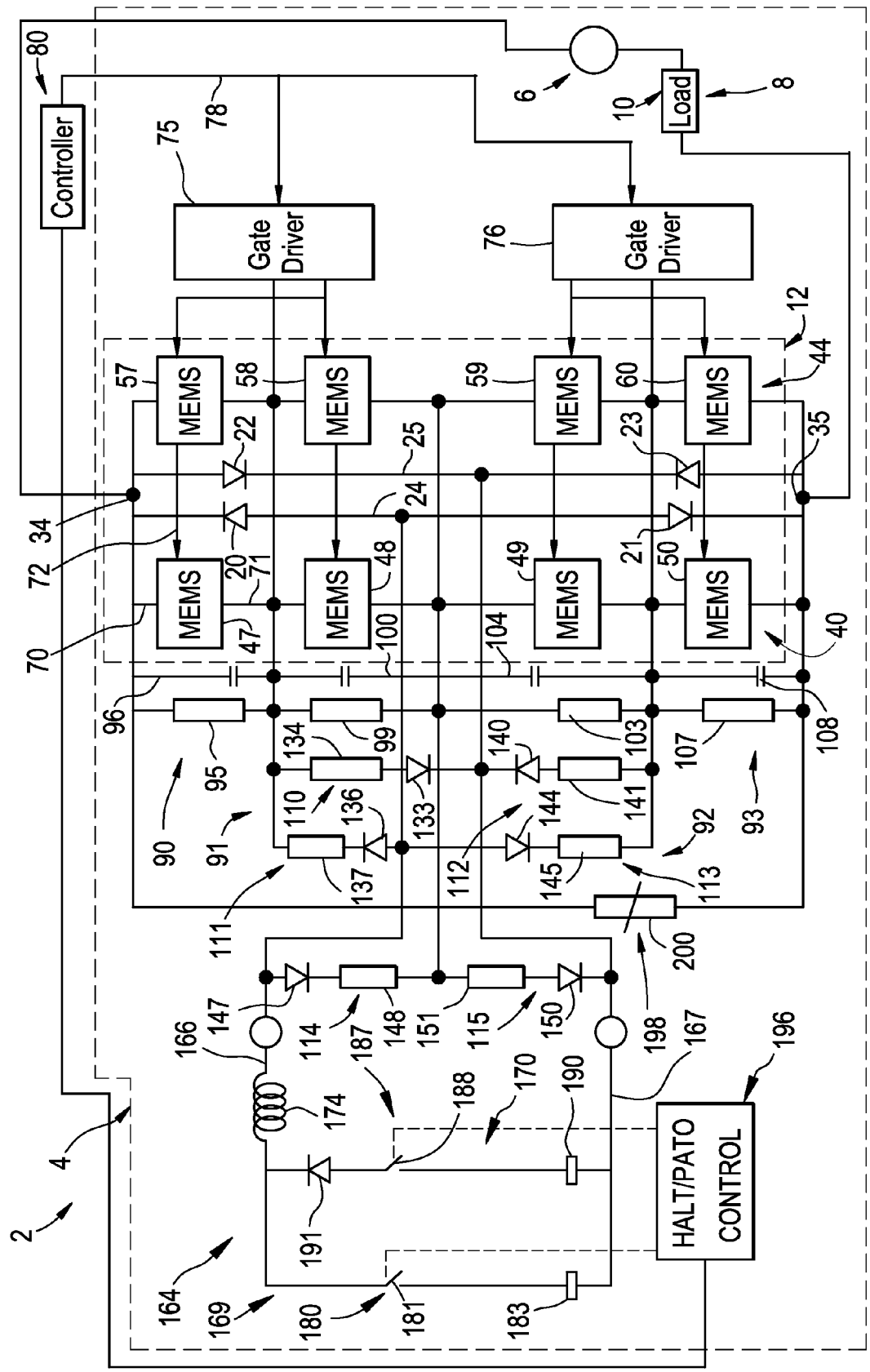

POWER SWITCHING SYSTEM INCLUDING A MICRO-ELECTROMECHANICAL SYSTEM (MEMS) ARRAY

BACKGROUND OF THE INVENTION

The subject matter disclosed herein relates to the art of power switching systems and, more particularly, to a power switching system including a micro-electromechanical system array.

Electrical systems employ contacts to switch a flow of current on and off. Contacts are closed to allow passage of the flow of current and open to stop the flow of current. Generally, the contacts may be used in contactors, circuit-breakers, current interrupters, or other electrical devices. A contactor is an electrical device designed to switch an electrical load ON and OFF on command. Traditionally, electromechanical contactors are employed to control operation of various electrical loads such as motors, lights and the like. Depending on their rating, electrical contactors are capable of handling various levels of switching currents. Conventional electromechanical contactors are relatively slow. More specifically, electromechanical contactors take considerable time to open a contact under a fault condition. Under fault condition, more time to open the contact means more fault current passing through a circuit. As such, electromechanical contactors are designed for a high fault current capability to address a worst possible fault current scenario. Given the need to carry high fault currents, convention electromechanical contactors are quite bulky.

As an alternative to slow mechanical and electromechanical switches, fast solid-state switches have been employed in high speed switching applications. As will be appreciated, solid-state switches change between a conducting state and a non-conducting state through controlled application of a voltage or bias. For example, by reverse biasing a solid-state switch, the switch may be transitioned into a non-conducting state. Conventional solid-state switches still lack the desired speed. As such, solid-state switches allow more fault current to flow before any fault is detected and the switch opened.

Switching currents on or off during current flow may produce arcs, or flashes of electricity, which are generally undesirable. To reduce arcs or flashes, both electro-mechanical and sold-state switches open contacts/switched upon sensing a fault condition at a zero crossing of the current in the case of alternating current (AC) systems. In contrast, direct current (DC) typically does not have a zero-crossing point. And hence it is more of a challenge to clear a fault condition. As such, in DC systems, arcs occur at any instance of interruption.

Presently, micro-electrical mechanical system (MEMS) switches are being considered for use in switching systems. Presently, MEMS generally refer to micron-scale structures that for example can integrate a multiplicity of functionally distinct elements, for example, mechanical elements, electro-mechanical elements, sensors, actuators, and electronics, on a common substrate through micro-fabrication technology. MEMS switches provide a fast response time that is suitable for use in both AC and DC applications. However, MEMS switches are sensitive to arcing. In order to mitigate the arcing, MEMS switches are connected in parallel with a Hybrid Arcless Limiting Technology (HALT) circuit and a Pulse-Assisted Turn On (PATO) circuit. The HALT circuit facilitates arcless opening of the MEMS switches while the PATO circuit facilitates arcless closing of the MEMS switches.

BRIEF DESCRIPTION OF THE INVENTION

According to one aspect of an exemplary embodiment, a switching system includes a plurality of diodes forming a diode bridge, and a micro-mechanical system (MEMS) switch array closely coupled to the plurality of diodes. The MEMS switch array is electrically connected in an (M×N) array. The (M×N) array includes a first MEMS switch leg electrically connected in parallel with a second MEMS switch leg. The first MEMS switch leg includes a first plurality of MEMS dies electrically connected in series, and the second MEMS switch leg includes a second plurality of MEMS dies electrically connected in series.

According to another aspect of the exemplary embodiment, a method of starting a motor includes transferring electrical energy to a pulse assisted turn on (PATO) circuit electrically connected in parallel to a micro-electromechanical system (MEMS) switch array to disrupt a current path to a motor, the MEMS switch array includes a first MEMS switch leg connected in parallel to a second MEMS switch leg. Each of the first and second MEMS switch legs includes a plurality of MEMS dies electrically connected in series to establish an M×N array. The method also includes transferring electrical energy to a hybrid arcless limiting technology (HALT) circuit electrically connected in parallel to the MEMS switch array to establish a current path to a motor.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The FIGURE is a schematic circuit diagram of a motor starter including micro-electromechanical system (MEMS) based switch system in accordance with an exemplary embodiment.

The detailed description explains embodiments of the invention, together with advantages and features, by way of example with reference to the drawings.

DETAILED DESCRIPTION OF THE INVENTION

A motor starter system in accordance with an exemplary embodiment is indicated generally at 2 in FIG. 1. Motor starter system 2 includes a switching system 4 operatively connected to a voltage source 6 and an electrical load 8. In the exemplary embodiment shown, electrical load 8 is described as an electric motor 10 however, it should be understood that electrical load 8 can take on a variety of forms without departing from the scope of the claims. In accordance with the exemplary embodiment, switching system 4 employs micro-electromechanical system (MEMS) switches to electrically connect voltage source 6 with electric motor 10. The use of MEMS based switches enables switching system 4 to be constructed with a very compact form factor.

Presently, MEMS generally refers to micron-scale structures that for example can integrate a multiplicity of functionally distinct elements, for example, mechanical elements, electromechanical elements, sensors, actuators, and electronics, on a common substrate through micro-fabrication technology. It is contemplated, however, that many techniques and structures presently available in MEMS devices will in just a few years be available via nanotechnology-based devices, for example, structures that may be smaller than 100 nanometers in size. Accordingly, even though example embodiments described throughout this document may refer to MEMS-based switching devices, it is submitted that the embodiments should be broadly construed and should not be limited to micron-sized devices.

In accordance with an exemplary embodiment, switching system 4 includes a MEMS switch array 12 that is closely coupled to a plurality of corner diodes 20-23 and connected such that MEMS switch array 12 is connected at center points (not separately labeled) of a balanced diode bridge (not separately labeled). The term "closely coupled" should be understood to mean that MEMS switch array 12 is coupled to corner diodes 20-23 with as small of a loop area as possible so as to limit the voltage created by stray inductance associated with the loop area to below about 1V. Loop area is defined as the area between each MEMS device or die in MEMS switch array 12 and the diode bridge. In accordance with one aspect of the exemplary embodiment, an inductive voltage drop across MEMS switch array 12 during a switching event is controller by maintaining a small loop inductance between MEMS switch array 12 and corner diodes 20-23. The inductive voltage across MEMS switch array 12 during switching is determined by three factors: The length of the loop area which establishes the level of stray inductance, second, MEMS switch current that is between about 1 A and about 10 A per parallel leg, and third, MEMS switching time which is about 1 μsec.

In accordance with one aspect of the exemplary embodiment, each die in MEMS switch array 12 carries about 10 A of current and can switch in approximately 1 microsecond. In with the exemplary aspect, total current transferred to the diode bridge would be 2 times the die capability or 20 A. Given the equation $V=L*di/dt$, stray inductance would be held to no more than about 50 nH. However, if each die in MEMS switch array was configured to carry 1 A, then stray inductance could be as high as about 500 nH.

In further accordance with the exemplary embodiment, the desired loop area can be achieved by, for example, mounting MEMS switch array 12 on one side of a chip and corner diodes 20-23 on another side of the chip, directly opposite MEMS switch array 12. In accordance with another example, corner diodes 20-23 could be positioned directly between two parallel arrangements of MEMS switches of MEMS switch array 12 as will be discussed more fully below. In accordance with still another example, corner diodes 20-23 could be integrally formed within one or more of the MEMS dies in MEMS switch array 12. In any event, it should be understood that the particular arrangement of MEMS switch array 12 and corner diodes 20-23 can vary so long as the loop area, and, by extension, inductance, is maintained as small as possible. While embodiments of the invention are described employing corner diodes 20-23, it will be appreciated that the term "corner" is not limited to a physical location of the diodes, but is more directed to a placement of the diodes that results in the desired degree of inductive coupling disclosed herein. More specifically, corner diodes 20-23 are connected so that MEMS switch array 12 is connected across a mid-point of the corner diodes 20-23.

Corner diodes 20-23 are arranged in a balanced diode bridge so as to provide a low impedance path for load current passing through MEMS switch array 12. As such, corner diodes 20-23 are arranged so as to limit inductance which, in turn, limits voltage changes over time, i.e., voltage spikes across MEMS array 12. In the exemplary embodiment shown, the balanced diode bridge includes a first branch 24 and a second branch 25. As used herein, the term "balanced diode bridge" describes a diode bridge that is configured such that voltage drops across both the first and second branches 24 and 25 are substantially equal when current in each branch 24, 25 is substantially equal. In first branch 24, diode 20 and diode 21 are coupled together to form a first series circuit (not separately labeled). In a similar fashion, second branch 25 includes diode 22 and diode 23 operatively coupled together to form a second series circuit (also not separately labeled). The balanced diode bridge is also shown to include connection points 34 and 35 that connect with voltage source 6 and load 8.

In further accordance with an exemplary embodiment, MEMS switch array 12 includes a first MEMS switch leg 40 connected in series (m) and a second MEMS switch leg 44 also connected in series (m). More specifically, first MEMS switch leg 40 includes a first MEMS die 47, a second MEMS die 48, a third MEMS die 49, and a fourth MEMS die 50 connected in series. Likewise, second MEMS switch leg 44 includes a fifth MEMS die 57, a sixth MEMS die 58, a seventh MEMS die 59 and an eighth MEMS die 60 that are connected in series. At this point it should be understood that each MEMS die 47-50 and 57-60 can be configured to include multiple MEMS switches. In accordance with one aspect of the exemplary embodiment, each MEMS die 47-50 and 57-60 includes 50-100 MEMS switches. However, the number of switches for each die 47-50 and 57-60 could vary. First MEMS switch leg 40 is connected in parallel (n) to second MEMS switch leg 44. With this arrangement, first and second MEMS switch legs 40, 44 form an (m×n) array which, in the exemplary embodiment shown, is a (4×2) array. Of course, it should be understood that the number of MEMS switch dies connected in series (m) and in parallel (n) can vary.

As each MEMS switch 47-50 and 57-60 includes similar connections, a detailed description will follow with reference to MEMS switch 47 with an understanding that the remaining MEMS switches 48-50 and 57-60 include corresponding connections. MEMS switch 47 includes a first connection 70, a second connection 71, a third connection 72 and a fourth connection 73. In one embodiment, first connection 70 may be configured as a drain connection, second connection 71 may be configured as a source connection and third and fourth connections 73 and 74 may be configured as gate connections. Gate connections 73 and 74 are connected to MEMS switch 57 and to a first gate driver 75. First gate driver 75 is associated with MEMS switches 47 and 48, and 57 and 58. A second gate driver 76 is associated with MEMS switches 49 and 50, and 59 and 60. Each gate driver 75, 76 includes multiple isolated outputs (not separately labeled) that are electrically coupled to MEMS switches 47-50 and 57-60 as shown. First and second gate drivers 75 and 76 also include a control logic input 78 that is connected to receive signals from a controller 80. With this arrangement, gate drivers 75 and 76 provide the means for selectively changing the state (open/closed) of MEMS switches 47-50, and 57-60.

In still further accordance with an exemplary embodiment, switching system 4 includes a plurality of grading networks connected to first and second MEMS switch dies 40 and 44. More specifically, switching system 4 includes a first grading network 90 electrically connected, in parallel, to first and fifth MEMS switches 47 and 57, a second grading network 91 is electrically connected, in parallel, to second and sixth MEMS switches 48 and 58, a third grading network 92 is electrically connected, in parallel, to third and seventh MEMS switches 49 and 59, and a fourth grading network 93 is electrically connected, in parallel, to fourth and eighth MEMS switches 50 and 60.

First grading network 90 includes a first resistor 95 connected in parallel to a first capacitor 96. First resistor 95 has a value of about 10K ohms and first capacitor 96 has a value of about 0.1 μF. Of course it should be understood that the values of first resistor 95 and first capacitor 96 can vary. Second grading network 91 includes a second resistor 99 connected in parallel with a second capacitor 100. Second resistor 99 and second capacitor 100 are similar to first resistor 95 and first capacitor 96 respectively. Third grading network 92 includes a third resistor 103 and a third capacitor 104. Third resistor 103 and third capacitor 104 are similar to first resistor 95 and first capacitor 96 respectively. Finally, fourth grading network 93 includes a fourth resistor 107 and a fourth capacitor 108. Fourth resistor 107 and fourth capacitor 108 are similar to first resistor 95 and first capacitor 96 respectively. Grading networks 90-93 aid in changing position of corresponding ones of MEMS switches 47-50 and 57-60. More specifically, grading networks 90-93 ensure a uniform voltage distribution across each MEMS element connected in series.

Switching system 4 is also shown to include a first intermediate branch circuit 110, a second intermediate branch circuit 111, a third intermediate branch circuit 112, a fourth intermediate branch circuit 113, a fifth intermediate branch circuit 114 and a sixth intermediate branch circuit 115. Intermediate branch circuits 110-115 are electrically connected between respective ones of first and second gate drivers 75 and 76 and first and second branches 24 and 25 of the balanced diode bridge. More specifically, first, second and fifth intermediate branch circuits 110, 111 and 114 are connected between first branch 24 and first grading network 90; and third, fourth, and sixth intermediate branch circuits 112, 113, and 115 are connected between second branch 25 and third grading network 92, First intermediate branch 110 includes a first intermediate diode 133 and a first intermediate resistor 134. The term intermediate diode should be understood to mean a diode that is connected across only a portion of MEMS switch array 12 as opposed to a corner diode that is connected across the entirety of MEMS switch array 12. Second intermediate branch 111 includes a second intermediate diode 136 and a second intermediate resistor 137. Third intermediate branch 112 includes a third intermediate diode 140 and a third intermediate resistor 141, and fourth intermediate branch 113 includes a fourth intermediate diode 144 and a fourth intermediate resistor 145. Fifth intermediate branch 114 includes a fifth intermediate diode 147 and a fifth intermediate resistor 148. Finally, sixth intermediate branch circuit 115 includes a sixth intermediate diode 150 and a sixth intermediate resistor 151. The arrangement of resistors and diodes in intermediate branch circuits 110-115 ensures that current flow through intermediate branches 110-115 remains low thereby allowing for a lower rating of diodes connected in intermediate branches 110-115. In this manner the cost and size of the intermediate diodes remains low. As such, in an M×N MEMS array switch only the corner diodes 20-23 need to possess a higher current rating, i.e., a current rating in the range of worst possible current flowing through load under a fault condition. While all other diodes of MEMS array can be of much smaller current rating.

Switching system 4 is also shown to include a single hybrid arcless limiting (HALT)/Pulse Activated Turn On (PATO) circuit 164. That is, in contrast to prior MEMS arrangements that require a separate HALT/PATO circuit for each MEMS member, the exemplary embodiment employs only a single HALT/PATO circuit for MEMS array 12. HALT/PATO circuit 164 includes a first branch 166 that is electrically connected to first branch 24 of the balanced diode bridge a second branch 167 that is electrically connected to second branch 25 of the balanced diode bridge. HALT/PATO circuit 164 also includes a HALT circuit portion 169 and a PATO circuit portion 170 electrically connected between first and second branched 166 and 167 through common inductor 174.

HALT circuit portion 169 is connected in parallel to PATO circuit portion 170. HALT circuit portion 169 includes a HALT switch 180 shown in the form of a switching diode 181. Switching diode 181 is connected in series with a HALT capacitor 183. PATO circuit portion 170 includes a pulse switch 187 shown in the form of a switching diode 188 connected in series with a pulse capacitor 190 and a pulse diode 191. An inductor 194 is connected in series to HALT and PATO circuit portions 169 and 170 in first branch 166. HALT/PATO circuit 164 is also shown to include a HALT/PATO control 196 that selectively activates HALT switch 180 when MEMS switches 47-50 and 57-60 are closed and PATO switch 187 when MEMS switches 47-50 and 57-60 are opened. That is, HALT switch 180 is closed to electrically power HALT circuit portion 169 to close MEMS switches 47-50 and 57-60, and pulse switch 187 is closed to electrically power PATO circuit portion 170 to open MEMS switches 47-50 and 57-60. The closing of MEMS switches 47-50 and 57-60 establishes a current path between voltage source 6 and electric motor 10. Conversely, opening MEMS switches 47-50 and 57-60 disrupts the current path between voltage source 6 and electric motor 10.

Switching system 4 is further shown to include a voltage snubber 198 that is connected in parallel with first and second pluralities of MEMS switches 40 and 44 as well as voltage source 6 and electric motor 10. Voltage snubber 198 limits voltage overshoot during fast contact separation of each of MEMS switches 47-50 and 57-60. Voltage snubber 198 is shown in the form of a metal-oxide varistor (MOV) 200. However, it should be appreciated by one of ordinary skill in the art that voltage snubber 198 can take on a variety of forms including circuits having a snubber capacitor connected in series with a snubber resistor.

At this point it should be appreciated that the exemplary embodiments provides a switching system that employs a (m×n) array of MEMS switches that can carry larger currents to expand the overall capability of the switching system. Moreover, the switching system employs a (m×n) array of MEMS switches that includes a single HALT/PATO circuit. The single HALT/PATO circuit replaces the multiple HALT/PATO circuits employed in conventional arrays of MEMS switches. The use of a single HALT/PATO circuit in combination with a MEMS array enables switching system 4 to support larger electric motors while maintaining a compact form factor and reducing circuit complexity and cost.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:
1. A switching system comprising:
a plurality of diodes forming a diode bridge; and
a micro-mechanical system (MEMS) switch array closely coupled to the plurality of diodes, the MEMS switch array being electrically connected in an (M×N) array, the (M×N) array including a first MEMS switch leg electri- cally connected in parallel with a second MEMS switch leg, the first MEMS switch leg including a first plurality of MEMS dies electrically connected in series, and the second MEMS switch leg including a second plurality of MEMS dies electrically connected in series.

2. The switching system according to claim 1, further comprising: a single hybrid arcless limiting technology (HALT) circuit electrically connected with the (M×N) array, the single HALT circuit being electrically powered to open the plurality of MEMS switches in the (M×N) array.

3. The switching system according to claim 2, further comprising: a single pulse assisted turn on (PATO) circuit electrically connected with the (M×N) array, the single PATO circuit being electrically powered to close the plurality of MEMS switches in the (M×N) array.

4. The switching system according to claim 3, wherein the single HALT circuit includes a HALT capacitor and pulse switch connected in series with an inductor.

5. The switching system according to claim 4, wherein the single PATO circuit includes a pulse capacitor and pulse switch connected in series with the inductor.

6. The switching system according to claim 5, wherein the single PATO circuit includes a blocking diode connected in series with the pulse capacitor and the pulse switch.

7. The switching system according to claim 6, wherein the HALT capacitor and HALT switch of the single HALT circuit are connected in parallel to the pulse capacitor and pulse switch of the single PATO circuit.

8. The switching system according to claim 1, wherein the plurality of diodes constitute corner diodes that are connected to the MEMS switch array to establish a loop area that is configured to limit stray inductance through each MEMS die to about 50 nH.

9. The switching system according to claim 1, wherein the first plurality of MEMS dies includes a first MEMS die, second MEMS die, a third MEMS die, and a fourth MEMS die.

10. The switching system according to claim 9, further comprising: a first grading network including a first resistor and a first capacitor connected in parallel, the first grading network being connected in parallel to the first and second MEMS dies.

11. The switching system according to claim 10, further comprising: a second grading network including a second resistor and a second capacitor connected in parallel to the third and fourth MEMS dies.

12. The switching system according to claim 9, further comprising: a first intermediate resistor and a first intermediate diode connected in series to the first and second MEMS dies.

13. The switching system according to claim 12, further comprising: a second intermediate resistor and a second intermediate diode connected in series with the third and fourth MEMS dies.

14. The switching system according to claim 1, further comprising: a metal oxide varistor (MOV) electrically connected in parallel to the (M×N) array.

15. A method of starting and stopping a motor, the method comprising:
transferring electrical energy to a pulse assisted turn on (PATO) circuit electrically connected in parallel to a micro-electromechanical system (MEMS) switch array to establish a current path to a motor, the MEMS switch array including a first MEMS switch leg connected in parallel to a second MEMS switch leg, each of the first and second MEMS switch legs including a plurality of MEMS dies electrically connected in series to establish an M×N array; and
transferring electrical energy to a hybrid arc less limiting technology (HALT) circuit electrically connected in parallel to the plurality of MEMS dies to disrupt a current path to a motor.

16. The method of claim 15, wherein transferring electrical energy from the plurality of MEMS dies to the HALT circuit includes incorporating a delay between opening of each of the plurality of MEMS switches.

17. The method of claim 15, wherein transferring electrical energy from the plurality of MEMS dies to the PATO circuit includes incorporating a delay between closing of each of the plurality of MEMS switches.

18. The method of claim 15, further comprising: maintaining a substantially zero potential at each of the plurality of MEMS dies.

19. The method of claim 15 further comprising: limiting stray inductance through each of the plurality of MEMS dies to no more than 50 nH.

20. The method of claim 15, further comprising: maintaining MEMS switch current through each of the first and second MEMS switch legs to between about 1A and about 10A.

* * * * *

UNITED STATES PATENT AND TRADEMARK OFFICE
CERTIFICATE OF CORRECTION

| | | |
|---|---|---|
| PATENT NO. | : 8,350,509 B2 | Page 1 of 1 |
| APPLICATION NO. | : 12/984338 | |
| DATED | : January 8, 2013 | |
| INVENTOR(S) | : Anand et al. | |

It is certified that error appears in the above-identified patent and that said Letters Patent is hereby corrected as shown below:

On the Title Page, in item (57), under "ABSTRACT", in Column 2, Line 2, delete "micro-mechanical system (MEMS)" and insert -- micro-electromechanical system (MEMS) --, therefor.

In the Specifications:

In Column 1, Line 48, delete "micro-electrical mechanical system (MEMS)" and insert -- micro-electromechanical system (MEMS) --, therefor.

In Column 2, Line 1, delete "micro-mechanical system (MEMS)" and insert -- micro-electromechanical system (MEMS) --, therefor.

In Column 3, Line 19, delete "controller" and insert -- controlled --, therefor.

In Column 5, Line 30, delete "92," and insert -- 92. --, therefor.

In Column 5, Line 58, delete "limiting" and insert -- limiting technology --, therefor.

In the Claims:

In Column 6, Line 64, in Claim 1, delete "micro-mechanical system (MEMS)" and insert -- micro-electromechanical system (MEMS) --, therefor.

In Column 8, Line 23, in Claim 15, delete "arc less" and insert -- arcless --, therefor.

Signed and Sealed this
Sixteenth Day of April, 2013

Teresa Stanek Rea
*Acting Director of the United States Patent and Trademark Office*